United States Patent Office 3,313,811
Patented Apr. 11, 1967

3,313,811
CYCLIC N,N'-DIMETHYLUREA
DISULFONIMIDES
Margot Becke, Heidelberg, Germany, assignor to
Olin Mathieson Chemical Corporation
No Drawing. Filed Mar. 19, 1964, Ser. No. 353,254
Claims priority, application Germany, Oct. 25, 1963,
B 74,015
5 Claims. (Cl. 260—243)

This invention relates to new sulfur and nitrogen containing 6-membered ring compounds and processes for their preparation.

Many heterocyclic compounds are known which contain sulfur and nitrogen in the ring. Hantzsch et al., Ber. 34, 3430 (1901) obtained ammonium salts of the general formula $(NH_4NSO_2)_x$ by the reaction of sulfuryl chloride with ammonia or by heating sulfamide to 180 to 200° C. This product formed a silver salt which by reaction with methyl iodide gave ring compound I:

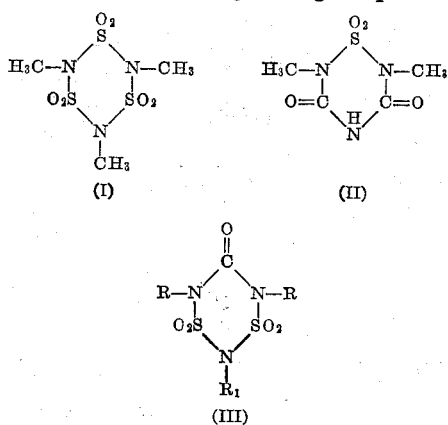

which was characterized as a 6-membered ring system by determination of the molecular weight. Ring compound II was prepared by Appel et al. from ammonia and sulfuryl diisocyanate, Chem. Ber. 91, 1200 (1958).

The products of this invention are new sulfur and nitrogen containing 6-membered ring compounds of general Formula III in which R stands for alkyl, substituted alkyl, aryl, or cycloalkyl groups or alicyclic, aromatic or heterocyclic substituted alkyl groups and $R_1$ stands for hydrogen, a metal cation or an alicyclic, aromatic or heterocyclic substituted alkyl group. According to the process of the invention, symmetrical disubstituted ureas of the general formula R—NH—CO—NH—R in which R has the same meaning as above are reacted with a halide of the formula $YN(SO_2X)_2$ in which Y is hydrogen or $POCl_2$ and X is chlorine or fluorine. When Y is $POCl_2$ this reactant has the formula $Cl_2P(O)N(SO_2X)_2$ and when X is chlorine the empirical formula is $$PNS_2O_5Cl_4$$

The resulting cyclic urea disulfonimide derivative has the general Formula III in which $R_1$ is hydrogen. These compounds in aqueous solution are strongly acid and by double decomposition form metal salts, for example, the silver salts. These react with alicyclic, aromatic or heterocyclic substituted alkyl halides of general formula $R_1$–Hal particularly the iodide to form ring compound III.

The starting materials for the process of this invention are readily available. Symmetrical disubstituted ureas can be obtained, for example, from isocyanates and water. The preparation of imino-bis sulfuryl halides has been described by Appel et al., Chem. Ber., 95 625 (1962). The acid chloride of formula $PNS_2O_5Cl_4$ is prepared from trimeric phosphonitrilic chloride and chlorosulfonic acid as described by M. Becke-Goehring et al., Z. anorg. allgem. Chem., 320, 27 (1963).

The process of the present invention can be carried out in the presence of an inert, anhydrous solvent or diluent. Especially suitable are solvents in which the substituted ureas are at least slightly soluble. The reactants must be anhydrous. The reaction is carried out in the absence of atmospheric moisture under nitrogen. By working without solvent, fewer by-products are formed. Purer products are obtained at temperatures between —30 and —15° C. When solvents are used, it is advantageous to utilize the dilution principle of Ruggli-Ziegler, Houben-Weyl, Methoden der Organischen Chem., volume IV, part 2, page 738. Yields in general are good. In order to accelerate or complete the process the reaction mixtures are warmed, suitably to the boiling point of 1,2-dichloroethane at 83.5° C. or somewhat higher, e.g., 100° C.

The cyclic sulfimide products of this invention are useful as pest control agents, wood preservatives and pharmaceuticals. The product of Example I is a pure, strong, monobasic acid suitable for use as an acidimetric standard.

Tested as a pre-emergence herbicide, several plots were sprayed with an aqueous suspension of 0.7% of the product of Example I, applying the suspended material at the rate of 10 pounds per acre. Plantings of crab grass showed 30% control and plantings of rye grass showed 60% control.

Example I

Separate solutions of 10.7 g. (0.05 mole) of imino-bis sulfuryl chloride and 4.4 g. (0.05 mole) of N,N'-dimethylurea, each in 250 ml. of anhydrous 1,2-dichloroethane were added dropwise during 5 hours into 800 ml. of boiling 1,2-dichloroethane. The reaction mixture was vigorously stirred and a slow stream of dry nitrogen was passed through in order to facilitate the separation of the evolved hydrogen chloride from the reaction medium. After addition was complete, the solution was refluxed for 30 minutes and then stirred until it cooled to room temperature. The mixture was filtered, in the absence of moisture, to separate the precipitated crystalline cyclic N,N'-dimethylurea disulfonimide. The crystals were washed several times with dry 1,2-dichloroethane and petroleum ether. The colorless crystals were freed from solvent at 12 mm. They were analytically pure and showed a melting point in vacuum of 157° C. with decomposition. Yield, 10 g. or 87% of theory.

Analysis for $C_3N_3S_2H_7O_5$ (229.25). Calc.: S, 27.98%; N, 18.33%; C, 15.72%; H, 3.08%. Found: S, 28.10%; N, 17.86%; C, 15.82%; H, 3.26%. Molecular weight in dimethyl sulfoxide, 132.

The fact that the molecular weight in dimethyl sulfoxide is only half that of the formula weight is to be expected since the compound behaves as a strong electrolyte in polar solvents and is dissociated into 2 monovalent ions. The dissociation of the compound in dimethyl sulfoxide is as great as that of picric acid or benzene sulfonic acid.

Ammonia was passed into a solution of 6.5 g. of the compound prepared above and dissolved in 25 ml. of methanol. When the pH of the solution was 6, a saturated solution of $AgNO_3$ in methanol was added. The silver salt precipitated, the precipitate stood for 2 hours in the dark and then was filtered, washed several times with methanol and petroleum ether and dried for 3 days in vacuum over phosphorus pentoxide at 55° C. Yield 4.7 g.

To 4.7 g. of the dry silver salt in a 50 ml. flask was added 25 ml. of methyl iodide with frequent shaking.

The flask was closed with a calcium chloride tube. The reaction proceeded with slight foaming and heat was evolved. After about 3 hours standing, the reaction mixture was filtered from precipitated silver iodide and the excess methyl iodide was separated in vacuum. There remained a dirty brown mass of crystals, which were recrystallized from boiling methanol. After drying in vacuum, the cyclic N,N'-dimethylurea disulfon-N-methylimide melted at 150.5° C. Yield 0.5 g.

Analysis for $C_4N_3S_2H_9O_5$ (243.27). Calc.: S, 26.36%; N, 17.27%; C, 19.75%; H, 3.73%. Found: S, 26.15%; N, 16.76%; C, 20.29%; H, 3.55%. Molecular weight, cryoscopically in benzene, 231.

*Example II*

Separate solutions were prepared containing 15.0 g. (0.046 mole) of the acid chloride of the formula $PNS_2O_5Cl_4$ and 3.99 g. (0.045 mole) of N,N'-dimethylurea which had been vacuum dried, each in 350 ml. of 1,2-dichloroethane which was anhydrous and freshly distilled. These two solutions were added dropwise during 6 hours with vigorous stirring to 600 ml. of boiling 1,2-dichloroethane contained in a 2-liter 3-necked flask fitted with stirrer, reflux condenser, gas inlet tube and two dropping funnels.

Because of the ready hydrolizability of the acid chloride and of the resulting N,N'-dimethylurea disulfonimide, it is necessary that the system before use be evacuated and filled with dry nitrogen.

In the course of the reaction, hydrogen chloride was evolved and the desired product separated in crystalline form on the walls of the flask. To facilitate the separation of the hydrogen chloride from the reaction medium, a slow stream of dry nitrogen was passed through the apparatus. After the addition of the reactants was completed, the reaction mixture was heated for 1 hour under reflux and then allowed to cool slowly with stirring to room temperature. Finally the crystalline reaction product was filtered in the absence of atmospheric moisture, washed several times with 1,2-dichloroethane and then dried at 12 mm. in a high vacuum. There resulted 9.29 g. or 89.5% of theory of colorless, analytically pure crystals of N,N'-dimethylurea disulfonimide which melted in vacuum at 159° C. with decomposition. From the mother liquor and the washings, a further 0.37 g. of light brown colored product was obtained. It was purified by dissolving in a little dimethyl sulfoxide and precipitating with an excess of 1,2-dichloroethane. Total yield 9.66 g. or 92.9% of theory.

*Example III*

The reaction was carried out in a 100 ml. 3-necked flask fitted with stirrer, reflux condenser and dropping funnel. The system was freed from atmospheric moisture by evacuation and filling with dry nitrogen. The flask containing 3.99 g. (0.045 mole) anhydrous N,N'-dimethylurea was cooled in a carbon dioxide-acetone bath to −20 to −25° C. and then 15.0 g. (0.045 mole) of the acid chloride of the formula $PNS_2O_5Cl_4$ was added dropwise slowly and with constant stirring. A clear colorless viscous oil resulted.

At the end of the reaction, the colorless oil was heated to 25 to 50° C. in a high vacuum with stirring. Gas bubbles were evolved continuously but slowly as a result of the high viscosity. After 5 to 6 hours in a high vacuum, the solution became cloudy and colorless crystals slowly separated.

At the end of the crystallization, the product was filtered in the absence of air. The oily filtrate became cloudy after a few more hours and the resulting crystals were again filtered. These steps were repeated several times. The odor of the oil, due to phosphorus oxychloride, steadily increased and the viscosity steadily decreased.

The crystals were washed with dry 1,2-dichlorethane and then freed from solvent at 12 mm. and finally in a high vacuum.

The analytically pure, white, strongly hygroscopic needles melted in a vacuum at 160° C. with decomposition. The yield after filtering off the crystals 15 times from the oil amounted to 6.31 g. or 63.0% of theory. The yield can be increased by further long standing and frequent filtering. The identity of this compound with the product of Examples I and II was established by vacuum melting point, Debyeogram, I.R. spectrum and chemical properties.

What is claimed is:
1. A compound having the formula

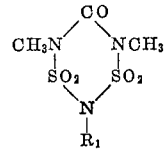

in which $R_1$ is selected from the group consisting of H, $NH_4$ Ag and $CH_3$.
2. The compound of claim 1 in which $R_1$ is H.
3. The compound of claim 1 in which $R_1$ is $NH_4$.
4. The compound of claim 1 in which $R_1$ is Ag.
5. The compound of claim 1 in which $R_1$ is $CH_3$.

References Cited by the Examiner

UNITED STATES PATENTS 2,466,396  4/1959  Dickey _____ 260—243
2,956,997  10/1960 Teufel _____ 260—243

OTHER REFERENCES

Becke-Goehring: Naturwissenschaften, vol. 50, pp. 353 (May 1963).

WALTER A. MODANCE, *Primary Examiner.*

JOHN M. FORD, *Assistant Examiner.*